United States Patent [19]

Lewis et al.

[11] Patent Number: 5,025,073
[45] Date of Patent: Jun. 18, 1991

[54] ONE PART HEAT CURABLE ORGANOPOLYSILOXANE COMPOSITIONS

[75] Inventors: Larry N. Lewis, Scotia; Chris A. Sumpter, Clifton Park, both of N.Y.

[73] Assignee: General Electric Company, Schenectady, N.Y.

[21] Appl. No.: 424,022

[22] Filed: Oct. 19, 1989

[51] Int. Cl.$^5$ .............................................. C08G 77/06
[52] U.S. Cl. ....................................... 528/15; 528/31; 528/32; 525/478
[58] Field of Search ............................ 528/15, 31, 32; 525/478

[56] References Cited

PUBLICATIONS

A. Harada and S. Takahashi, Preparation and Properties of Inclusion Compounds to Transition Metal Complexes of Cyclo-octa-1,5-diene and Norbornadiene with Cyclodextrins. J. of Chem. Soc. No. 16, 1986.

A. Harada and S. Takahashi, Preparation and Properties of Cyclodextrin-Ferrocene Inclusion Complexes. J. of Chem. Soc. 1984.

A. Harada, Y.Hu, S. Yamamoto & S. Takahashi, Preparation and Properties of Inclusion Compounds of Ferrocene and its Derivatives and Cyclodextrins, J. Chem. Soc. Dalton Trans. 1988.

B. Nageshwer Rao, M. S. Syamala, N. J. Turro & V. Ramamurthy Modification of Photochemical Reactivity by Cyclodextrin Complexation: A Remarkable Effect on the Photobehavior of α-Alkyldibenzyl Ketones. J. Org. Chem. 1987, 52, 5517-5527.

H. C. Clark & L. E. Manzer, Reactions of ($\pi$-1,5-Cyclooctadiene) Organoplatinum(II) Compounds and the Synthesis of Perfluoroalkylplatinum complexes, J. of Org. Chem. 59(1973) 411-428.

D. R. Alston, A. M. Z. Salwin, J. F. Stoddart, D. J. Williams & R. Zarzycki Second Sphere Coordination ADducts of Phosphane-Transition Metal Complexes with $\beta$-Cyclodextrin and its Methylated Derivative Angew. Chem. Int. Ed. Engl. 27 (1988) No. 9.

D. R. Alston, A. M. X. Slawin, J. F. Stoddart & D. J. Williams, Cyclodextrins as Second Sphere Ligands for Transition Metal Complexes-The X-Ray Crystal Structure of (Rh(cod)9CH$_3$)$_2$. cyclodextrin(PF$_6$).6-H$_2$O-Angew Chem. Int. Ed. Engl. 24 1985.

*Primary Examiner*—Melvyn I. Marquis
*Attorney, Agent, or Firm*—William A. Teoli; James C. Davis, Jr.; William H. Pittman

[57] ABSTRACT

Shelf stable heat curable mixtures of vinyl-substituted organopolysiloxane fluids and siloxanehydride are provided. These one part organopolysiloxane mixtures are catalyzed with an inclusion compound of a platinum metal complex, such as a complex of a platinum halide and 1,5-cyclooctadiene and a cyclodextrin.

6 Claims, No Drawings

ONE PART HEAT CURABLE ORGANOPOLYSILOXANE COMPOSITIONS

BACKGROUND OF THE INVENTION

The present invention relates to one part heat curable organopolysiloxane compositions having improved shelf stability. More particularly the present invention relates to the employment of a hydrosilylation catalyst in the form of an inclusion compound of a cyclodextrin such as β-cyclodextrin and a complex of a platinum halide and an aliphatically unsaturated cyclic compound such as 1,5-cyclooctadiene.

Prior to the present invention, as shown by Kookootsedes et al., U.S. Pat. No. 3,445,420, one component organopolysiloxane compositions were based on a platinum catalyzed silicon hydride-silicon vinyl addition reaction which generally utilized an inhibitor for the platinum catalyst. The purpose of the inhibitor was to slow down the hydrosilylation reaction to increase the work life of the one component organopolysiloxane mixture at low or room temperatures. The organopolysiloxane mixtures were generally composed of a base polymer consisting of a polydiorganosiloxane having chemically combined methylvinylsiloxy units which was used in combination with a siliconhydridesiloxane. Additional inhibited one package silicon hydride-silicon vinyl one package platinum addition curable organopolysiloxane compositions are shown by Berger et al., U.S. Pat. No. 3,882,083, utilizing an ethylenically unsaturated isocyanurate as an inhibitor, and U.S. Pat. No. 4,472,562 and 4,472,563 employing acetylenic unsaturated inhibitors.

In copending application Ser. No. 07/364,557, filed May 22, 1989, one part heat curable organopolysiloxane compositions are described utilizing platinum catalyst which is microencapsulated in an organic resin, such as a thermoplastic organic polymer, or a thermosetting organic polymer. The microencapsulated catalyst is in the form of capsules having an average diameter of about 4-60 microns. Although satisfactory shelf stability under ambient conditions can be achieved with the use of such microencapsulated platinum catalysts in one part mixtures of a vinyl-substituted diorganosiloxane fluid and a siloxane hydride fluids, it has been found that the capsules often settle to the bottom of the one part heat curable organopolysiloxane mixture, or reduce the transparency of the curable mixture.

SUMMARY OF THE INVENTION

The present invention is based on the discovery that one part heat curable organopolysiloxane compositions can be made by using as a latent platinum catalyst, an inclusion compound of a complex of a platinum halide with a diene, such as 1,5-cyclooctadiene (COD), with a cyclodextrin, such as β-cyclodextrin (BCD). A typical inclusion compound of a platinum halide with COD and BCD is shown by Akira Harada et al. Journal of the Chemical Society, Chemical Communications, No. 16, (1986) pp. 1229-1230. It has been found that the use of the aforementioned platinum inclusion compounds in one part heat curable silicone mixtures can provide shelf stabilities exceeding 7 months or more at ambient temperatures and substantially transparent cured organopolysiloxane products.

STATEMENT OF THE INVENTION

There is provided by the present invention, one part heat curable organopolysiloxane compositions comprising by weight:

(A) 100 parts of a vinyl-substituted organopolysiloxane fluid, (B) 1 to 20 parts of a siloxane hydride and (C) an effective amount of an inclusion compound of a cyclodextrin with a complex of a platinum halide and a member selected from a cyclooctadiene and norbornadiene.

The vinyl-substituted organopolysiloxane fluid, hereinafter referred to as the "vinylsiloxane" utilized in the one part heat curable organopolysiloxane compositions of the present invention can have a viscosity of from about 100 to 200,000 centipoises. Although vinyl substitution can be on the polysiloxane backbone, a preferred vinyl siloxane is included within the following formula:

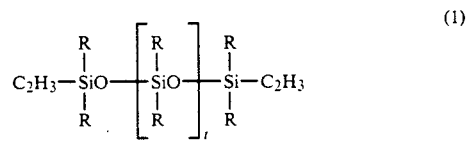

where $C_2H_3$ is vinyl, and R is selected from $C_{(1-13)}$ monovalent organic radicals free of olefinic unsaturation, and t is a positive integer having a value sufficient to provide a vinyl siloxane viscosity of from about 100 to 200,000 centipoises at 25° C. Preferably, R is selected from alkyl radicals of 1 to 8 carbon atoms, such as methyl, ethyl, propyl; monovalent aryl radicals such as phenyl, methylphenyl, ethylphenyl; cycloalkyl radicals, cycloheptyl and haloalkyl radicals such as 3,3,3-trifuloropropyl. Preferably, the vinyl siloxane has terminal units of the formula, $$C_2H_3(CH_3)_2SiO_{0.5}$$

which can vary from about 0.05 to about 3.5 mole percent, based on the total chemically combined siloxy units and preferably from 0.14 to about 2 mole percent.

The vinylsiloxane of Formula (1) can be prepared by equilibrating cyclotetrasiloxane with a vinyl terminated low molecular weight polysiloxane chainstopper. However, if vinyl organosiloxy units are desired in the backbone, a predetermined amount of cyclic vinylorganosiloxane can be used in the equilibration mixture. The chainstopper is preferably a low molecular weight vinyl terminated organopolysiloxane, such as the corresponding disiloxane, trisiloxane, tetrasiloxane. These low molecular weight vinyl terminated polysiloxane polymers are produced by hydrolyzing the appropriate chlorosilanes particularly vinyldiorganochlorosilane along with diorganodichlorosilane to produce the desired vinyl chainstopped polydiorganosiloxanes. The equilibration catalyst which can be used is preferably a mild acid catalyst, such as toluenesulfonic acid or an acid treated clay. An alkali metal hydroxide as the catalyst such as potassium or sodium hydroxide also can be used as the equilibration catalyst When the equilibration has proceeded to the point where about 85% of the cyclopolysiloxane has been converted to linear polymer, the acid catalyst can be neutralized or filtered out.

Preferably, excess cyclics are stripped off so that the linear polymer will have a low volatile content.

Included within the siloxane hydride is a "coupler", having the formula,

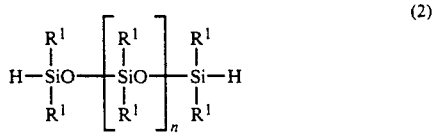
(2)

where $R^1$ is selected from $C_{(1-13)}$ monovalent organic radicals free of olefinic unsaturation and n is an integer having a value sufficient to provide the "coupler" with a viscosity of 1 to 500 centipoises at 25° C. and from about 3 to 9 mole percent of chainstopping diorganohydride siloxy units, based on the total moles of chemically combined siloxy units in the siloxane hydride.

In addition to the coupler of formula (2), the siloxane hydride used in the heat curable polysiloxane compositions of the present invention also can include siloxane hydride resins consisting essentially of the following chainstopping unit,

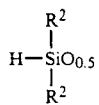

condensed with silicate ($SiO_2$) units, where the $R^2+H$ to Si ratio can vary from 1.0 to 2.7. A discussion of silicone resins is shown in Rochow Chemistry of the Silicones, pp. 90– 94, Second Edition, John Wiley and Sons, N.Y., 1951, which is incorporated herein by reference. Siloxane hydride resins also can have the above condensed chainstopping units chemically combined with $SiO_2$ units and $(R^3)_2SiO$ units, where the $R^2+R^3+H$ to Si ratio can vary from 1.2 to 2.7, where $R^2$ and $R^3$ are $C_{(1-13)}$ monovalent organic radicals free of olefinic unsaturation and can be selected from $R^1$ radicals.

The siloxane hydride resins can be made by hydrolyzing the corresponding hydride chlorosilanes in the presence of an organic hydrocarbon solvent. To prepare resins having only monofunctional $(R^2)_3SiO_{0.5}$ units and tetrafunctional $SiO_2$ units, there can be cohydrolyzed a hydrogen diorganochlorosilane and tetrachlorosilane. Resins having monofunctional siloxy units, difunctional siloxy units, and tetrafunctional siloxy units, can be obtained by hydrolyzing a hydrogendiorganochlorosilan, tetrachlorosilane and a diorganodichlorosilane at particular ratios. Additional siloxane hydride resins are shown by Jeram, U.S. Pat. No. 4,040,101 which is incorporated herein by reference.

The siloxane hydride also can include linear organopolysiloxane having the formula,

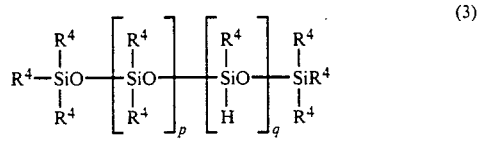
(3)

where $R^4$ is a $C_{(1-3)}$ monovalent organic radical free of olefinic unsaturation, and p and q are integers having values sufficient to provide a polymer having a viscosity of from 1 to 1,000 centipoises at 25° C., and wherein the polysiloxane has from 0.04 to 1.4 by weight of hydrogen.

The siloxane hydride of formula (3) can be produced by equilibrating the appropriate hydrogencyclopolysiloxane with the appropriate cyclopolysiloxane containing $R^4$ substituent groups, in combination with low molecular weight linear triorganosiloxane chainstoppers.

In formulas (2) and (3), and the above siloxane hydride resins, the chemically combined units can have $R^1$, $R^2$, $R^3$ and $R^4$ radicals, which can be the same or different and are selected from alkyl radicals having from 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The siloxane hydride of formula (2) is prepared by either a hydrolysis process or by an acid catalyzed equilibration process. In the equilibration process, cyclopolysiloxane is equilibrated with a low molecular weight hydrogen terminated chainstopper, such as a dihydrogentetraorganodisiloxane. The acid catalyzed equilibration reaction is similar to the method used for the production of the vinyl containing base polymer. In the hydrolysis process, hydrogendiorganochlorosilane is hydrolyzed with diorganodichlorosilanes to produce the polymer of formula (2). The resulting siloxane hydride can be separated from undesirable cyclics by stripping.

The platinum catalyst used in the practice of the present invention can be in the form of an inclusion compound of cyclodextrin, such as $\beta$-cyclodextrin, $\alpha$-cyclodextrin or $\gamma$-cyclodextrin, and a platinum metal complex of cycloocta-1,5diene or norbornadiene with a platinum halide such as $PtCl_1$. It can be made in accordance with the procedure of Akira Harada et al. as previously cited, which is incorporated herein by reference. For example, an inclusion compound of the diene platinum complex and the cyclodextrin can be prepared by adding fine crystals of the diene platinum complex to a saturated aqueous solution of the cyclodextrin at 40° C. The product which precipitates can be washed with water to remove the remaining cyclodextrin and dried in vacuo. Nonincluded platinum complex can be removed by washing the residue with tetrahydrofuran and the product recrystallized from water or aqueous ethanol. The diene platinum complex can be made in accordance with the procedure of H. C. Clark et al., Journal of Organic Metallic Chemistry, 59 (1973), 411– 428, pp. 411-423 and particularly pages 411, 421 and 423, which is incorporated herein by reference.

An effective amount of the platinum catalyst of the present invention is that amount of inclusion compound which is sufficient to provide from 5 ppm to 200 ppm of platinum based on the weight of heat curable organopolysiloxane compound composition, and preferably from 10 ppm to 100 ppm.

There can be incorporated in the heat curable organopolysiloxane compositions of the present invention from 5 to 100 parts by weight of a filler based on a 100 parts by weight of the vinyl siloxane. The filler can be selected from fumed silica, precipitated silica and mixtures thereof. Preferably less than 50 parts by weight of filler, per 100 parts by weight of the vinyl siloxane is utilized. In place of the reinforcing filler, such as fumed silica, and precipitated silicas, there may be utilized extending fillers which do not unduly increase the viscosity of the composition in the uncured state, by increasing to some extent the tensile strength of the composition. The reinforcing and extending fillers are for instance, titanium dioxide, lithopone, zinc oxide, zirconium silicate, silica aerogel, iron oxide, diatomaceous earth, calcium carbonate, silazane treated silicas, glass fibers, magnesium oxide, chromic oxide, zirconium oxide, aluminum oxide, alpha quartz, calcined clay, carbon, graphite, cork, cotton, synthetic fibers and so forth.

For liquid injection molding applications, it has been found desirable to limit the viscosity below 500,000 centipoises at 25° C. and more preferably, below 200,000 centipoises at 25° C.

Cure of the heat curable compositions of the present invention, can be achieved at temperatures of from 100° C. to 200° C. and preferably 135° C. to 150.C.

In order that those skilled in the art will be better able to practice the present invention, the following examples are given by way of illustration and not by way of limitation. All parts are by weight.

EXAMPLE 1

A solution of 3.1 grams of $\beta$-cyclodextrin (BCD) and 25 ml of water was heated to 60° C. until the BCD dissolved. There was added to the solution, 1 gram (2.67 millimoles) of $CODPtCl_2$ (COD=1,5-cyclooctadiene). After three hours, a precipitate was obtained which was washed with water and then methylene chloride. The remaining solid was dried in vacuo to give 3.32 grams (78% yield) of a gray powder, M.P. 238° C. Based on method of preparation, the product was an inclusion compound of $CODPtCl_2$ in BCD. Elemental analysis for $C_{50}H_{82}Cl_2O_{35}Pt$ calculated: C 41.1, H 5.52, Pt, 13.03; Found: C 37.44, H 5.61, Pt 11.7. DSC analysis showed an endotherm at 219° C. followed by an exotherm from 250–300.C. These results showed that the material was contaminated with about 2–3% unreacted BCD.

A one part heat curable organopolysiloxane composition was prepared by incorporating 100 ppm of platinum into a base mixture of 4.5 grams of a vinyl terminated dimethylsiloxane fluid having a viscosity of 4000 centipoise, and 0.5 grams of a siloxanehydride consisting essentially of condensed methylhydrogensiloxy units, dimethylsiloxy units and terminated with trimethylsiloxy units having a viscosity of 50–150 centipoise and 0.8 weight percent of hydrogen. A one part curable mixture was prepared by using 1 milligram of $CODPtCl_2$ and another heat curable mixture was prepared using 3.9 milligram of $BCD-CODPtCl_2$ to provide 100 ppm of platinum in each mixture. The respective mixtures were then measured for shelf stability at ambient temperature to 70° C. and gel time at 130–150° C. The following results were obtained:

TABLE I

| Catalyst | Temp. (°C.) | Gel Time |
|---|---|---|
| $BCDCODPtCl_2$ | 25 | >7 mos. |
| " | 70 | 27 days |
| " | 130 | 16 min. |
| " | 150 | 7 min. |
| $CoDPtCl_2$ | 25 | 12 hrs. |
| " | 130 | 1.5 min. |

The above results show that the inclusion compound of the platinum complex in $\beta$-cyclodextrin was substantially more stable as a hydrosilylation catalyst than the platinum complex itself. In addition, cured mixtures were transparent.

EXAMPLE 2

$CODPtI_2$ was prepared from $CODPtCl_2$ by reacting the $CODPtCl_2$ with NaI in accordance with the procedure of C. R. Kistner et al., Inorganic Chem., 2 (1963) 1255. The $CODPtI_2$ was reacted with $\beta$-cyclodextrin to form a 1:1 inclusion complex. The inclusion complex was used to catalyze the silicone mixture of Example 1. The resulting heat curable mixture gelled within 12 minutes at 150° C. and was stable for at least 35 days under ambient conditions.

Although the above Examples are directed to only a few of the very many variables which can be employed in the practice of the method of the present invention, it should be understood that the present invention is directed to the use of a much broader variety of inclusion compounds as well as ingredients used in the silicone base mixture for making heat curable organopolysiloxanes as set forth in the description preceding these examples.

What is claimed is:

1. One part heat curable organoplysiloxane compositions comprising by weight:
   (A) 100 parts of a vinyl-substituted organopolysiloxane fluid,
   (B) 1 to 20 parts of a siloxane hydride and
   (C) an amount of an inclusion compound of a cyclodextrin and a complex of a platinum halide and a member selected from a cyclooctadiene or a norbornadiene which is effective as a latent platinum catalyst.

2. A heat curable one part organopolysiloxane composition in accordance with claim 1, where the vinyl-substituted organopolysiloxane fluid is a vinyl-substituted polydimethylsiloxane fluid.

3. A heat curable one part organopolysiloxane composition in accordance with claim 1, where the siloxanehydride is a methylsiloxane hydride fluid.

4. A heat curable one part organopolysiloxane composition in accordance with claim 1, where the cyclodextrin is $\beta$-cyclodextrin.

5. A heat curable one part organopolysiloxane composition in accordance with claim 1, where the platinum halide complex is 1,5-cyclooctadiene $PtCl_2$.

6. A heat curable one part organopolysiloxane composition in accordance with claim 1, where the platinum halide complex is 1,5-cyclooctadiene $PtI_2$.

* * * * *